United States Patent
Friedman et al.

(10) Patent No.: US 6,804,784 B1
(45) Date of Patent: Oct. 12, 2004

(54) BACK-CHANNELING IN A MEMORY VAULT SYSTEM

(75) Inventors: George Friedman, Austin, TX (US); Robert Phillip Starek, Austin, TX (US); Carlos A. Murdock, Austin, TX (US)

(73) Assignee: Infraworks Corporation, TX (US)

( * ) Notice: Subject to any disclaimer, the term of this patent is extended or adjusted under 35 U.S.C. 154(b) by 552 days.

(21) Appl. No.: 09/701,458

(22) PCT Filed: Sep. 29, 2000

(86) PCT No.: PCT/US00/26896

§ 371 (c)(1),
(2), (4) Date: Nov. 22, 2000

(87) PCT Pub. No.: WO01/25932

PCT Pub. Date: Apr. 12, 2001

(51) Int. Cl.[7] ............................................... G06F 12/14
(52) U.S. Cl. ...................... 713/200; 713/202; 709/227; 705/404; 705/60; 705/410; 380/51
(58) Field of Search ................................ 711/163, 111, 711/112, 115, 152, 164; 713/200, 155; 705/26, 51, 59, 60, 401, 408, 404, 410; 707/101, 203, 204; 709/227, 247, 219, 229, 217, 218, 203, 201; 380/51

(56) References Cited

U.S. PATENT DOCUMENTS

| | | | |
|---|---|---|---|
| 4,621,321 A | | 11/1986 | Boebert et al. |
| 5,347,578 A | | 9/1994 | Duxbury |
| 5,956,710 A | | 9/1999 | Yarom |
| 6,356,941 B1 | * | 3/2002 | Cohen ........................ 709/219 |
| 6,366,930 B1 | * | 4/2002 | Parker et al. ................ 707/203 |
| 6,449,652 B1 | * | 9/2002 | Blumenau et al. .......... 709/229 |
| 6,466,983 B1 | * | 10/2002 | Strazza ....................... 709/227 |
| 6,553,466 B1 | * | 4/2003 | Friedman et al. ........... 711/152 |
| 6,615,275 B2 | * | 9/2003 | Yohe et al. ................. 709/247 |

* cited by examiner

*Primary Examiner*—Ly V. Hua
(74) *Attorney, Agent, or Firm*—Piper Rudnick LLP

(57) ABSTRACT

A file system security driver and vault method and system particularly applicable to a system in which protected data is segregated from other data, which allows for back-channeling of file data in order to ensure that files created by applications using secured data do not cause data leaks of secure data. In a preferred embodiment, a file system security driver is a driver resident on the kernel level which monitors file system requests and allows limited access to files resident on the vault and creation of files within the vault when necessary.

16 Claims, 5 Drawing Sheets

BACK-CHANNELING IN A MEMORY VAULT SYSTEM

FIELD OF THE INVENTION

The invention relates to the protection of data stored in a computer; and more particularly to the protection of data stored in a memory vault system.

BACKGROUND OF THE INVENTION

In order to secure data from unauthorized access, the data may be encrypted. Encryption algorithms are commonly designed to use a key pair—one key for encryption and one key for decryption. Encryption is used to encode information and send it as an encrypted file. Encryption may also be used to set up a secure connection between two computers so that eavesdroppers will not be able to intercept data being exchanged.

An encrypted container may be used to protect data within a computer system. An encrypted container is a reserved area on a disk to which protected files are copied and saved. This may be implemented by creating a file which is encrypted, and which is mounted as and acts as a file system. Prior art encrypted containers allow content distributors to distribute content to users without endangering the security of the content. A client side container-opener application is used to access the encrypted container. The client side container-opener may limit the accesses to data in the encrypted container in any number of ways. For example, it may allow the data to be accessed only at certain times or with a proof of payment key.

Prior art encrypted container systems contain limited security once the container is opened and the data released. When a file is opened in a computer running prior art software and operating systems, the data may leak to applications (such as clipboard or other system. applications) and may be copied and left insecure during system operations, such as printing. This compromises the system.

Some client side container-openers may come with integrated data-display mechanisms which allow the user to view the secure data. For example, Folio (NextPage, Inc.) provides a viewer browser to display files and the viewer browser prevents unauthorized use of data by turning off application level controls. However, this means that when documents in Folio are displayed, data can still be saved to the clip board and attacked in other ways from the system level.

Watermarking or digital fingerprinting by the client side container-opener application can be used to trace the origin of content which has been opened and removed from an encrypted container. This will allow tracing of content which has been distributed in an unauthorized way. However, this still allows the data to be viewed by unauthorized users.

SUMMARY OF THE INVENTION

The invention discloses a memory vault system and method particularly applicable to a system in which protected data is transmitted to a recipient with access controls. An illustrative embodiment of the invention comprises a computer system in which secured data in a memory vault is accessed via a system-level security application which enforces strict access controls on data, and outside applications permitted to access data are monitored and certain system-level commands from these outside applications mediated by the security application. Back-channeling of any data derived from secured data is effected so that all data remains secured.

DESCRIPTION OF THE DRAWINGS

The invention is best understood from the following detailed description when read with the accompanying figures.

DETAILED DESCRIPTION OF THE INVENTION

The invention disclosed allows a computer system including a memory vault system to include the use of secured data from the vault by insecure applications without modification of these applications or security breaches. This is done by implementing back-channeling of data used or produced by these insecure applications (in other words, the segregation of this kind of data and the creation of any of this data in the vault rather than elsewhere in system memory) and thereby protecting in the same way that the original secured data is protected.

Figure 1:
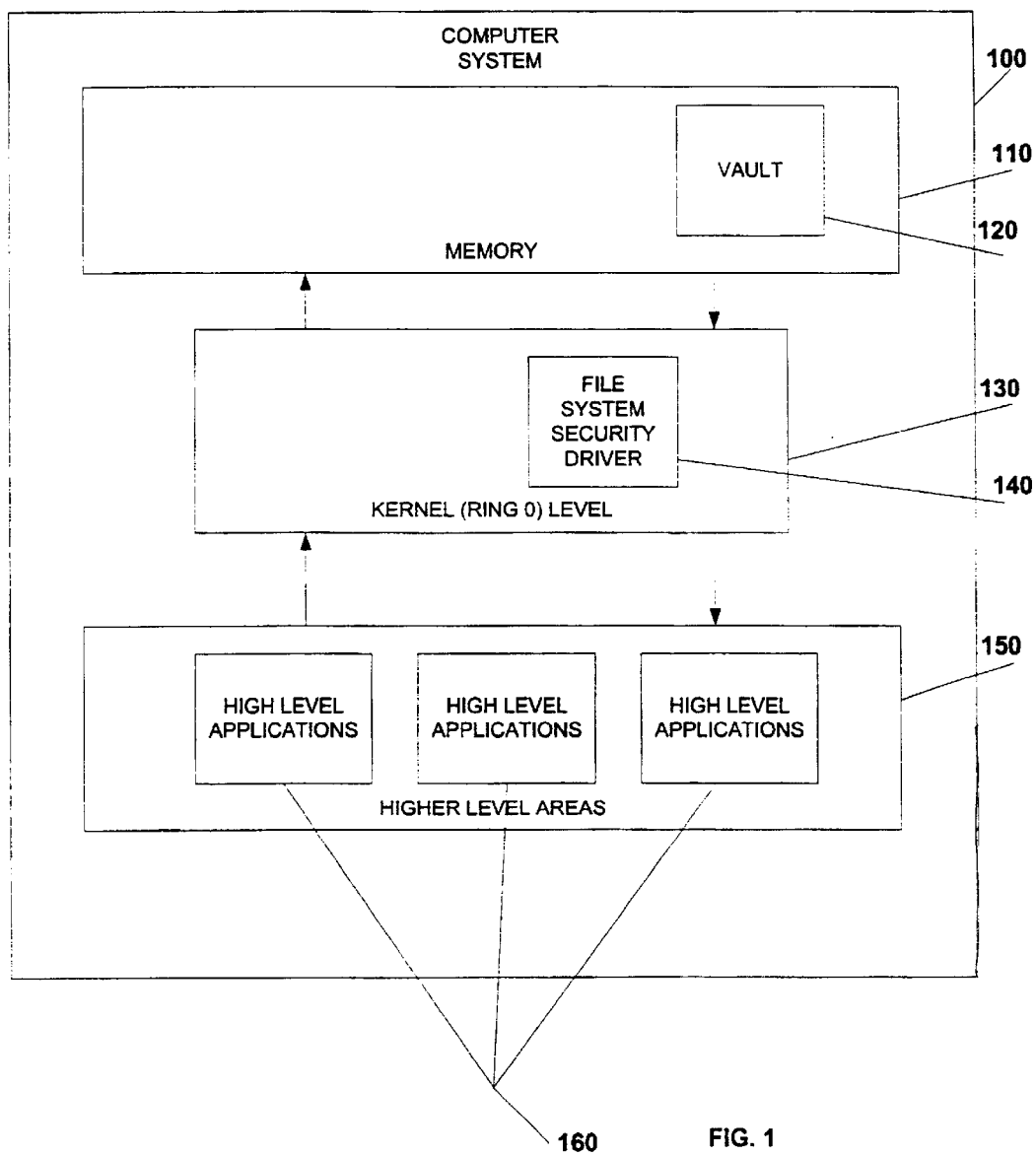
FIG. 1 is an schematic diagram of a computer system operating according to an illustrative embodiment of the back-channeling method of the invention.

With reference to FIG. 1, in a preferred embodiment, the back-channeling method is implemented on a computer system 100. Computer system 100 contains memory 110, which may be configured in any number of ways and may include several memory systems and kinds of memory media. Resident in memory 110 is at least one vault 120. In a preferred embodiment, a vault 120 uses the logical construct of a file, and within it is embedded a simple, robust file structure able to manage data from heterogenous file sources. Memory 110 and hardware are directly accessed only by kernel-mode applications resident in the kernel (ring 0) level 130. One such kernel-mode application is the file system security driver 140. Higher-level applications 160 which are in any higher level (collectively shown in FIG. 1 as 150) access memory only via applications resident in the kernel (ring 0) level 130, as shown by the arrows. In a preferred embodiment of the invention, the security system associated with file system security driver 140 ensures that requests for data by higher-level applications 160 are always handled by file system driver 140. The file system security driver 140 keeps information on secured processes running, file handles that higher-level applications use to reference secured files and other vault files, and vault file handles which file system security driver 140 can use to access secured files and other vault files. The file system security driver 140 uses this information to ensure that access to vault information is possible but restricted. It does this by intercepting and acting on file open, file read/write, file information, and file change requests. These requests are handled as shown in FIGS. 2 through 5.

Figure 2:
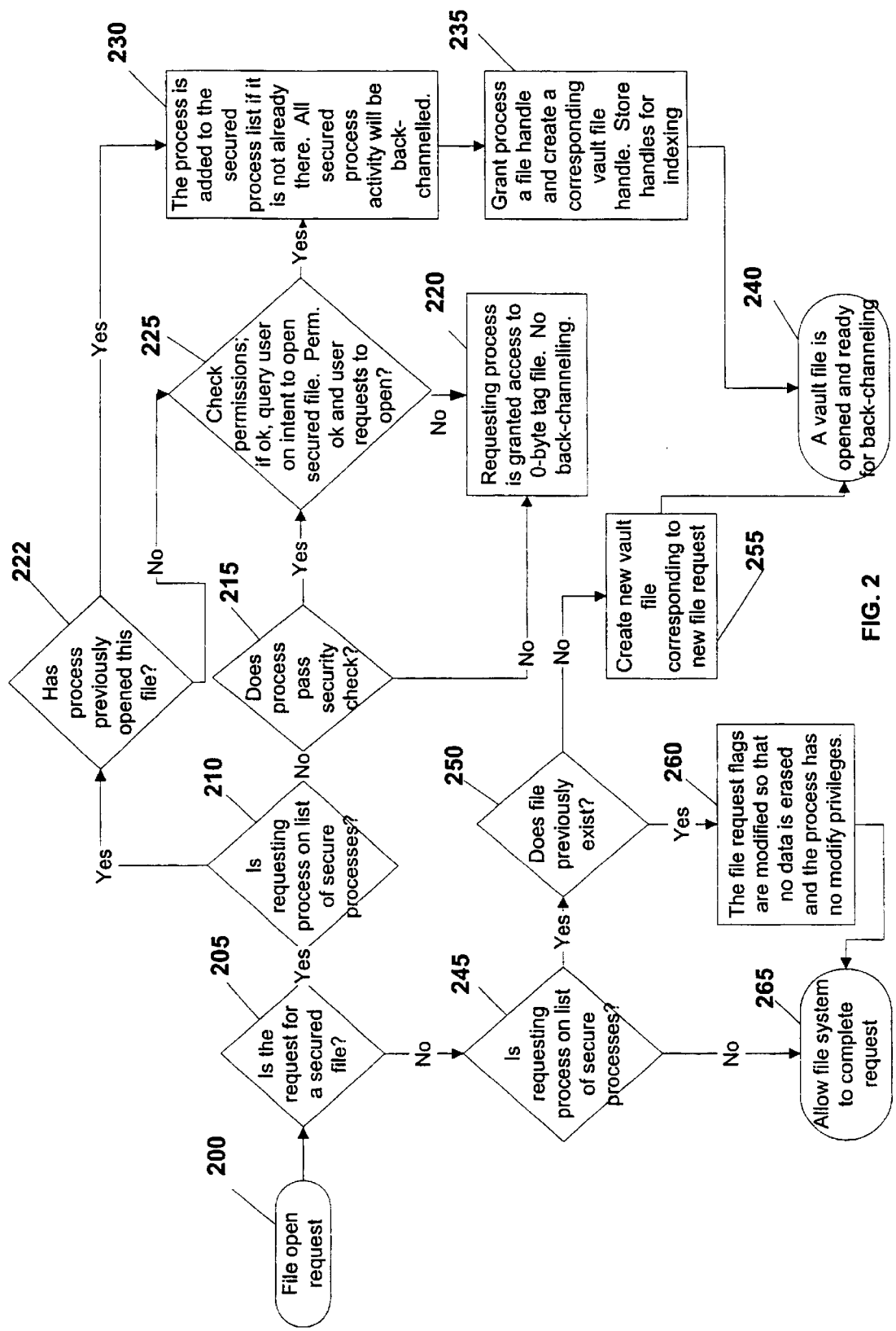
FIG. 2 is a flow chart of a file open in a memory vault system according to an illustrative embodiment of the back-channeling method of the invention.

With reference to FIG. 2, a process sends a file open request which is received by file system security driver 140 (FIG. 1). Upon receipt of a file open request 200, the request is examined to see if it is for a secured file 205. If it is, then the request is examined to see if the requesting process is on the secured process list 210.

If the request is for a secured file, and the requesting process is not on the secured process list, then a security check is performed by a security driver on the requesting process 215. If the process does not pass the security check, then the requesting process gets access to a 0-byte tag file instead of the file requested 220. If the process does pass the security check, then permissions are checked, and the user is queried about whether the user wants to open a secured file 225. If permission is not allowed, or if the user does not want to open it, then the requesting process gets access to a 0-byte tag file instead of the file requested 220. If the user does want to open it, the process is added to the secured process list 230. (Information about the opening of a secured file will be passed to the part of the security driver in order to monitor the number of file opens permitted.) The process will be granted a file handle and a corresponding vault file handle will be created; these handles will be stored for indexing on the opened file list 235. In this way, a file is opened and ready for back-channeling 240.

If the request is for a secured file, and the requesting process is on the secured process list then if the process has not previously opened the requesting file the check and query 225 will occur. If the process has opened it before, the process activity is back channeled. The process is granted a file handle and a corresponding vault file handle will be created; these handles will be stored for indexing on the opened file list 235. A file is open and ready for back-channeling 240.

If the request is not for a secure file, then the secured process list is consulted to see if the request was made by a secure process 245. If it is, then a check is made to see if the file exists 250. If it does not, then in order to back-channel, a file is created in the vault which corresponds to the file request 255. In this way, a secured process is not allowed to create a file outside of the vault (an insecure file). This is back-channeling—not permitting a secured process to "leak" secure information to a file which is not protected by the vault.

If the request is by a secure process, but for a file which is not secure, then the file request flags for the file open request are modified so that no data in the insecure file can be erased or modified 260. In this way a secured process can access non-secure data outside of the vault, but can not write to it—preventing secure data from being written to an insecure (non-vault) file. The modified request is passed to the file system for completion 265.

If the request is not for a secure file and not made by a secure process, then the request has no security implications, and the request is passed to the file system for completion 265.

In this way, secured data can only be accessed by secured processes, new files opened by secured processes are always created in the vault, and insecure files opened by secured processes can not be written to.

Figure 3:
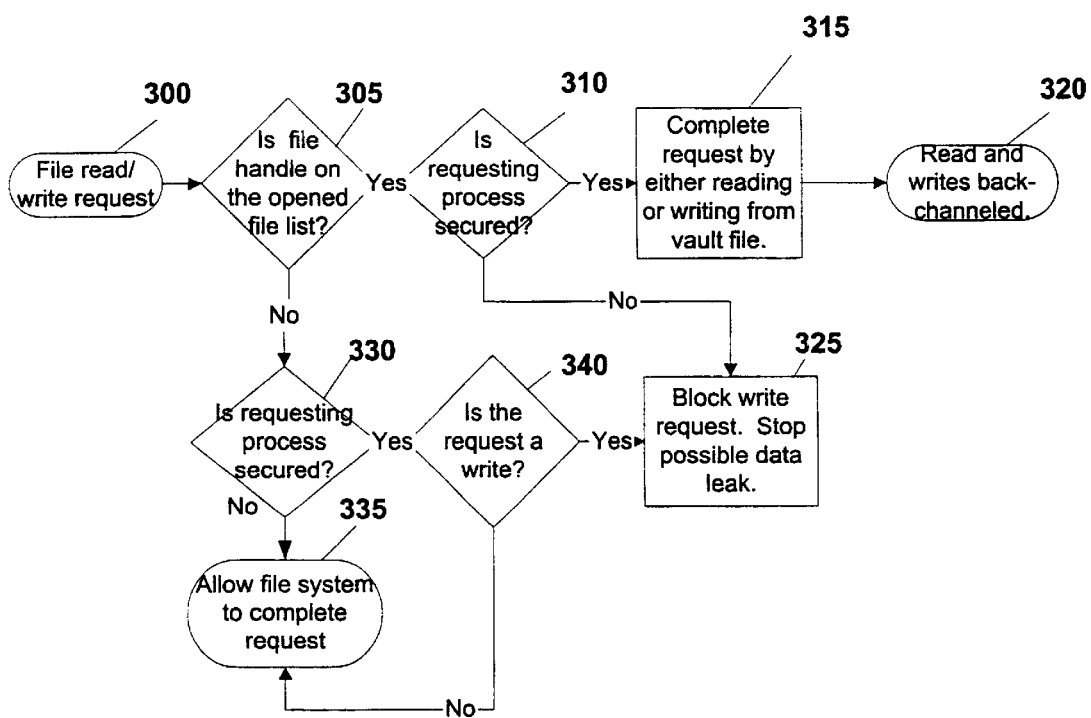
FIG. 3 is a flow chart of a file read/write in a memory vault system according to an illustrative embodiment of the back-channeling method of the invention.
Figure 4:
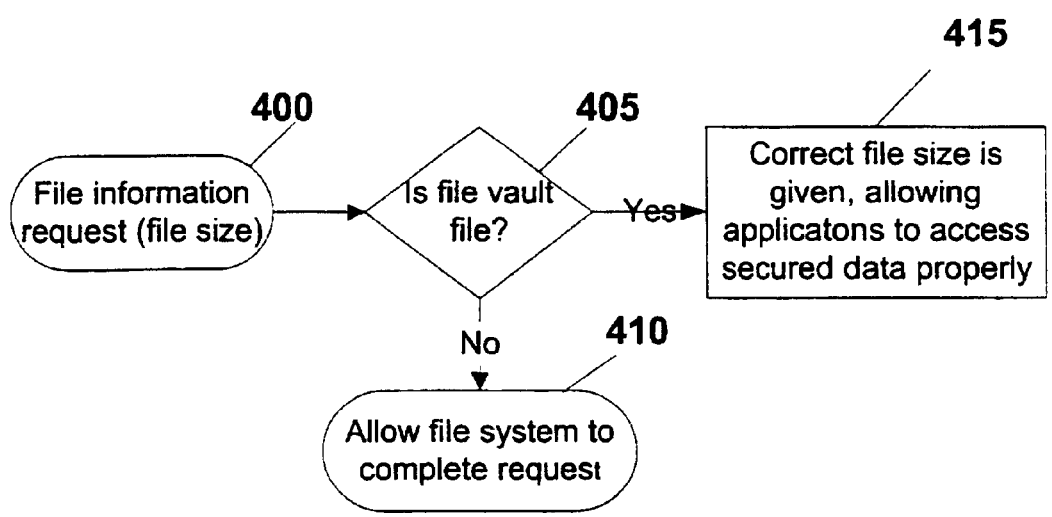
FIG. 4 is a flow chart of a file information request in a memory vault system according to an illustrative embodiment of the back-channeling method of the invention.

As shown in FIG. 3, back-channeling is also enforced when file read/write requests are intercepted by the file system security driver (140, FIG. 1). When such a request is received 300, a check is performed to see if the file handle is on the opened file list 305. If it is, then the file is in the vault. A check is performed to see if the requesting process is on the secured process list 310. If it is, then the request is completed by performing the request on the corresponding vault file 315, thus back-channeling the read or write request 320. If it is not, then the request is for a secured file by an insecure process, and the request is denied 325.

If the file handle was not on the opened file list at check 305, a further check is done to see if the process is on the secured process list 330. If it is not, then the file system is allowed to complete the request 335. If it is, then the request is examined to see if it is a write request 340. If it is not, the file can be opened, even though it is insecure and the process is secure, since no secure data can be leaked by reading an insecure file. The request is passed to the file system 335. If the file is insecure, the process secure, and the request is a write—in this situation there is the danger of a data leak. Therefore the write request is blocked 325.

File information requests are handled differently—the correct file size can be accessed even by insecure processes. This is file size spoofing—in the preferred embodiment, the file system sees the secured file's reference as pointing to a zero-byte file, and if a file-size request were handled by the file system, it would return a size of zero. In the preferred embodiment, non-secure processes are allowed to see the size of secure files, and therefore, with reference to FIG. 4, when the request is received 400, a check is performed to see if it is a vault file 405. If it is not a vault file, then the request is passed to the file system to complete 410. If it is a handle for a vault file or the name of the vault file, then size of the corresponding actual vault file is checked and returned 415.

Figure 5:
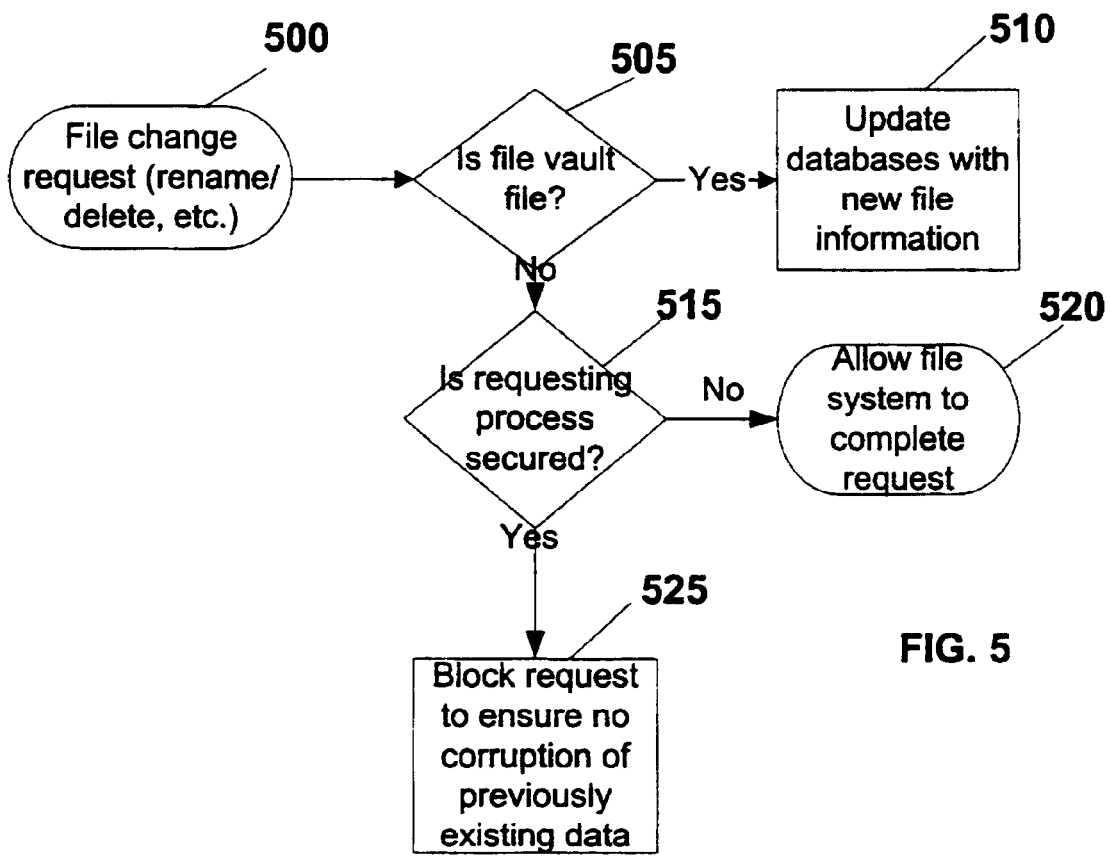
FIG. 5 is a flow chart of a file change request in a memory vault system according to an illustrative embodiment of the back-channeling method of the invention.

File change requests—change requests which are not reads, writes, or opens—are handled similarly to file writes. With reference to FIG. 5, when a file change request is received 500, the request is examined to see if the file referenced is a vault file 505. If it is, then the opened file list and other databases are updated with new file information 510. If the file is not a vault file, then the process is checked to see if it is a secured process 515. If it is not a secured process, then no security concern at all is implicated, and the request is passed to the file system for completion 520. If it is a secured process but the file is not secured, then the request is blocked, to ensure that the secured process will not corrupt previously existing data 525.

A further illustrative embodiment of the invention is directed to a file system security driver wherein the driver implements a vault system with back-channeling according to the methods provided herein. The illustrative file system security driver comprises a driver resident on the kernel level which monitors file system requests and allows limited access to files resident on the vault and creation of vault files when necessary.

Further disclosed is a secured data transmission system having a receiver component to access secured file content provided by a sender, wherein the receiver includes a vault system and a file system security driver acts according to the methods provided herein.

Still further disclosed is a computer configured to include a vault system and a computer-readable medium programmed to monitor file system requests and allow limited access to files resident on the vault and creation of vault files, according to the methods provided herein.

The terms "computer", "computer system", or "system" as used herein include any electronic device having a processor or microprocessor including, without limitation, a personal computer, such as a laptop, palm PC, desktop or workstation, a network server, a mainframe, an electronic wired or wireless device, such as for example, a telephone, an interactive television, such as for example, a television adapted to be connected to the Internet or an electronic device adapted for use with a television, a cellular telephone, a personal digital assistant, an electronic pager, a digital watch, or any other device capable of receiving information, such as email, from another source. A computer, computer system, or system of the invention may operate in communication with other systems over a network, such as, for example, the Internet, an intranet, or an extranet, or may operate as a stand-alone system.

While the invention has been described by illustrative embodiments, additional advantages and modifications will occur to those skilled in the art. Therefore the invention in its broader aspects is not limited to specific details shown and described herein. Modifications may be made without departing from the spirit and scope of the invention. Accordingly, it is intended that the invention not be limited to the specific illustrative embodiments but be interpreted within the full spirit and scope of the appended claims and their equivalents.

What is claimed is:

1. A method for securing data comprising:
   a vault provision step of providing a vault system for segregating vault data from other system data; and
   a file system security driver provision step of providing a file system security driver which intercepts file system calls, and for each specific one of said intercepted file system calls, determines whether said specific one of said intercepted file system calls is from a process accessing said vault data, and, if said specific one of said intercepted file system calls is from a process accessing said vault data, permitting the file system call to either create data or modify data only within said vault system.

2. The method of claim 1, where said file system security driver provision step further comprises a file open handling step for each specific one of said intercepted file system calls which is a file open call, comprising the steps of:
   determining whether said file open call is a request for data from among said vault data; and
   if said file open call is a request for data from among said vault data, performing a check on process making said request to see if said process is already a secured process which has previously opened said data from among said vault data, and if so, allowing access to said vault data, and if not performing an access check on process making said request, and then processing the request by allowing access to said process which is not already a secured process if said access check is passed but not allowing access at all if said access check is not passed;
   if said file open call is not a request for data from among said vault data, performing a check on said process making said request to see if said process is already a secured process, and passing the request onto an operating system if said process making said request is not a secured process, and, if said process making said request is a secured process, determining if file referred to in said file open call exists, and if it does, opening said file for read only, and if it does not, creating said file in said vault data.

3. The method of claim 2, where said processing the request by allowing access to said process which had not previously been granted access to said vault data comprises the step of:
   querying user to determine if said user would like to open said data from among said vault data, and opening said data from among said vault data only if said user would like to open said data.

4. The method of claim 3, where said processing the request by allowing access to said process which had not previously been granted access to said vault data comprises the step of:
   recording said allowed access and monitoring total accesses allowed.

5. The method of claim 2, where said processing the request by allowing access to said process which had not previously been granted access to said vault data comprises the step of:
   recording said process which had not previously been granted access to said vault data making said request in a list of processes allowed to access said vault data.

6. The method of claim 2, where said step of creating said file in said vault data comprises the step of:
   sending said secured process a stand-in file handle;
   creating a corresponding vault file handle; and
   storing said stand-in file handle and said corresponding vault file handle.

7. The method of claim 2, where said step of opening said file for read only comprises the steps of:
   modifying any file request flags of said file open call which indicating modification of the file is permitted; and
   passing said modified file open call to said operating system.

8. The method of claim 1, where said file system security driver provision step further comprises a file processing request handling step for each specific one of said intercepted file system calls which is either one of a file read call or a file write call, comprising the steps of:
   determining whether said processing request is a request for data from among said vault data;
   if said processing request is a request for data from among said vault data, allowing access to said vault system if said process making said request is allowed to access said vault data; and
   if said processing request is a request for data not from among said vault data, allowing access to said vault system if said process making said request is not allowed to access said vault data, and allowing access to said vault system if said processing request is a read request.

9. The method of claim 1, where said file system security driver provision step further comprises a file information request step, comprising the step of:
   determining whether said file information request is a request regarding data from among said vault data, and if not, passing said file information request to operating system, and if so, discerning correct file size and returning said correct file size.

10. The method of claim 1, where said file system security driver provision step further comprises a file change request step, comprising the step of:
    determining whether said file change request is a request regarding data from among said vault data, and if so performing said file change request on said vault data, and if not, checking to see if the requesting process is a secured process, and if not, passing said file change request to an operating system, and if so, blocking the request.

11. The method of claim 1, where said file system security driver provision step further comprises:

a file open handling step for each specific one of said intercepted file system calls which is a file open call, comprising the steps of:
  determining whether said file open call is a request for data from among said vault data; and
  if said file open call is a request for data from among said vault data, performing a check on process making said request to see if said process is already a secured process which has previously opened said data from among said vault data, and if so, allowing access to said vault data, and if not performing an access check on process making said request, and then processing the request by allowing access to said process which is not already a secured process if said access check is passed but not allowing access at all if said access check is not passed; and
  if said file open call is not a request for data from among said vault data, performing an access check on said process making said request to see if said process is already a secured process, and passing the request onto an operating system if said process making said request is not a secured process, and, if said process making said request is a secured process, determining if file referred to in said file open call exists, and if it does, opening said file for read only, and if it does not, creating said file in said vault data;
a file read/write request handling step of, for each specific one of said intercepted file system calls which is a file read/write call, comprising the steps of:
  determining whether said read/write request is a request for data from among said vault data;
  if said read/write request is a request for data from among said vault data, allowing access if process making said request is allowed to access said vault data; and
  if said read/write request is a request for data not from among said vault data, allowing access if said process making said request is not allowed to access said vault data, and allowing access if said read/write request is a read request;
a file information request step, comprising the step of:
  determining whether said file information request is a request regarding data from among said vault data, and if not, passing said file information request to said operating system, and if so, discerning correct file size and returning said correct file size; and
a file change request step, comprising the steps of:
  determining whether said file change request is a request regarding data from among said vault data, and if so performing said file change request on said vault data, and if not, checking to see if the requesting process is a secured process, and if not, passing said file change request to said operating system, and if so, blocking the request.

12. A computer data signal embodied in a transmission medium for execution on a computer system, wherein the computer data signal comprises one or more code segments which when executed on a computer causes the computer to process data by including a file system security driver and a vault system wherein said vault system segregates vault data from other system data; and said file system security driver intercepts file system calls, and for each specific one of said intercepted file system calls, determines whether said specific one of said intercepted file system calls is from a process accessing said vault data, and, if said specific one of said intercepted file system calls is from a process accessing said vault data, permitting the file system call to create or modify data only within said vault system.

13. A computer-readable medium programmed for execution by a processor to cause a computer system to process data by including a file system security driver and a vault system wherein said vault system segregates vault data from other system data; and said file system security driver intercepts file system calls, and for each specific one of said intercepted file system calls, determines whether said specific one of said intercepted file system calls is from a process accessing said vault data, and, if said specific one of said intercepted file system calls is from a process accessing said vault data, permitting the file system call to create or modify data only within said vault system.

14. A secured data transmission system having a receiver to access secured file content provided by a sender, wherein the receiver includes a file system security driver and vault system and where said vault system segregates vault data from other system data; and said file system security driver intercepts file system calls, and for each specific one of said intercepted file system calls, determines whether said specific one of said intercepted file system calls is from a process accessing said vault data, and, if said specific one of said intercepted file system calls is from a process accessing said vault data, permitting the file system call to create or modify data only within said vault system.

15. A computer configured to protect secure data by including a file system security driver and vault system and where said vault system segregates vault data from other system data; and said file system security driver intercepts file system calls, and for each specific one of said intercepted file system calls, determines whether said specific one of said intercepted file system calls is from a process accessing said vault data, and, if said specific one of said intercepted file system calls is from a process accessing said vault data, permitting the file system call to create or modify data only within said vault system.

16. A computer-readable medium programmed for execution by a processor to cause a computer system to protect secure data by including a file system security driver and vault system and where said vault system segregates vault data from other system data; and said file system security driver intercepts file system calls, and for each specific one of said intercepted file system calls, determines whether said specific one of said intercepted file system calls is from a process accessing said vault data, and, if said specific one of said intercepted file system calls is from a process accessing said vault data, permitting the file system call to create or modify data only within said vault system.

* * * * *